US012267691B2

(12) United States Patent
Smith et al.

(10) Patent No.: US 12,267,691 B2
(45) Date of Patent: *Apr. 1, 2025

(54) CHANNEL COORDINATION OF PRIVATE WIRELESS NETWORKS UTILIZING SHARED SPECTRUM

(71) Applicant: Cisco Technology, Inc., San Jose, CA (US)

(72) Inventors: Malcolm Muir Smith, Richardson, TX (US); Jerome Henry, Pittsboro, NC (US); John Martin Graybeal, Califon, NJ (US); Vishal Satyendra Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/968,194

(22) Filed: Oct. 18, 2022

(65) Prior Publication Data

US 2023/0041650 A1 Feb. 9, 2023

Related U.S. Application Data

(63) Continuation of application No. 17/129,414, filed on Dec. 21, 2020, now Pat. No. 11,510,066.

(51) Int. Cl.
*H04W 24/08* (2009.01)
*G06N 20/20* (2019.01)
(Continued)

(52) U.S. Cl.
CPC ............ *H04W 16/14* (2013.01); *G06N 20/20* (2019.01); *H04W 24/08* (2013.01); *H04W 72/1263* (2013.01); *H04W 72/535* (2023.01)

(58) Field of Classification Search
CPC ..... H04W 16/14; H04W 16/16; H04W 24/08; H04W 72/1263; H04W 72/535; G06N 20/20
See application file for complete search history.

(56) References Cited

U.S. PATENT DOCUMENTS 11,190,948 B2 * 11/2021 Kakinada .......... H04W 72/0453
11,399,290 B2 * 7/2022 Mahalingam ......... H04W 24/02
(Continued)

FOREIGN PATENT DOCUMENTS

EP 3270627 A1 1/2018
EP 3462762 A1 4/2019

OTHER PUBLICATIONS

Office Action for U.S. Appl. No. 17/129,414, filed Mar. 29, 2022, "Channel Coordination of Private Wireless Networks Utilizing Shared Spectrum", 11 pages.
(Continued)

*Primary Examiner* — Meng Vang
*Assistant Examiner* — Hector Reyes
(74) *Attorney, Agent, or Firm* — Lee & Hayes, P.C.

(57) ABSTRACT

The present technology allows coordination of channels of private wireless networks utilizing shared licensed and unlicensed spectrum. Wireless network operators in an enterprise location register to participate in a consortium and register licensed, shared, and unlicensed spectrum resources to be shared with other members of the consortium. The wireless network operators request an allocation of spectrum resources from the consortium. The consortium generates a radio resource management ("RRM") plan for shared use of the licensed, shared, and unlicensed spectrum resources. The consortium combines the allocated licensed, shared, and unlicensed spectrum from each of the wireless network operators to meet the target RRM plan. The consortium monitors spectrum utilization to dynamically update the
(Continued)

RRM. The consortium monitors spectrum utilization in real time to determine how closely the RRM plan matches the resources allocated to each wireless network operator.

18 Claims, 9 Drawing Sheets

(51) Int. Cl.
*H04W 16/14* (2009.01)
*H04W 72/1263* (2023.01)
*H04W 72/50* (2023.01)

(56) References Cited

U.S. PATENT DOCUMENTS

| | | |
|---|---|---|
| 2011/0283287 A1 | 11/2011 | Ha |
| 2015/0289141 A1 | 10/2015 | Ghasemzadeh et al. |
| 2017/0013465 A1* | 1/2017 | Luo ................. H04W 24/02 |
| 2017/0188241 A1 | 6/2017 | Mueck et al. |
| 2018/0014304 A1* | 1/2018 | Khoshnevisan .. H04W 72/0453 |
| 2018/0139666 A1* | 5/2018 | Ahmavaara ........... H04W 24/10 |
| 2018/0234140 A1 | 8/2018 | Chen et al. |
| 2019/0141713 A1* | 5/2019 | Cimpu ................. H04W 72/541 |
| 2019/0159176 A1 | 5/2019 | Barton et al. |
| 2020/0045615 A1 | 2/2020 | Karimli et al. |
| 2021/0168618 A1 | 6/2021 | Yavuz et al. |
| 2021/0185705 A1* | 6/2021 | Jones ................. H04W 72/51 |
| 2022/0007200 A1 | 1/2022 | Sevindik et al. |
| 2022/0046641 A1* | 2/2022 | Sayenko ........... H04W 72/0453 |
| 2022/0201497 A1 | 6/2022 | Smith et al. |

OTHER PUBLICATIONS

Kim G., "Bonding and 4G and 5G Spectrum," Spectrum Futures, Mar. 16, 2019, 2 Pages.

METIS: "Mobile and Wireless Communications Enablers for the Twenty-twenty Information Society (METIS)", Document No. ICT-317669-METIS/D5.4, Future spectrum system concept, Apr. 30, 2015, XP055314246, 94 Pages.

PCT Search Report and Written Opinion mailed Apr. 4, 2022 for PCT application No. PCT/US2021/064315, 190 pages.

Examination Report for Indian Application No. 202347035113, Dated Oct. 21, 2024, 7 pages.

* cited by examiner

800

Allocated Channels A and B

Allocated Channels C and D

Allocated Channels E and F

Allocated Channels G and H

CHANNEL COORDINATION OF PRIVATE WIRELESS NETWORKS UTILIZING SHARED SPECTRUM

RELATED APPLICATIONS

This application claims priority to and is a continuation of U.S. patent application Ser. No. 17/129,414, filed on Dec. 21, 2020, the entire contents of which are incorporated herein by reference.

TECHNICAL FIELD

This disclosure relates to coordinating channels of private wireless networks using spectrum resources in an enterprise location, and more particularly, to dynamically allocating and reallocating shared resources.

BACKGROUND

Spectrum is increasingly becoming allocated for either unlicensed usage, where a spectrum license is not required, or for shared usage with a coordination entity, such as a spectrum access server or an automated frequency coordinator. The coordination entity, either centralized or distributed, allocates and manages spectrum resources based on geo-location, transmit power, physical separation, capacity, and/or bandwidth requests.

With regard to technologies traditionally used in unlicensed spectrum, such as Wi-Fi or future 5G NR-U, use of shared spectrum can provide benefits with regard to greater determinism because of the absence of uncontrolled interference. However, in conventional systems, shared spectrum is not always suited to all technologies. For example, Wi-Fi is well suited to a spectrum resource of an unlicensed 6 GHz band, but a Wi-Fi user may not be allocated sufficient spectrum resources from a reserved or licensed spectrum resource, such as a US citizens broadband radio service ("US CBRS"). Conventional systems are unable to discover spectrum coverage areas and overlaps and allocate licensed, locally-licensed, unlicensed, and shared spectrum resources in an enterprise location.

DETAILED DESCRIPTION

Overview

Figure 1:
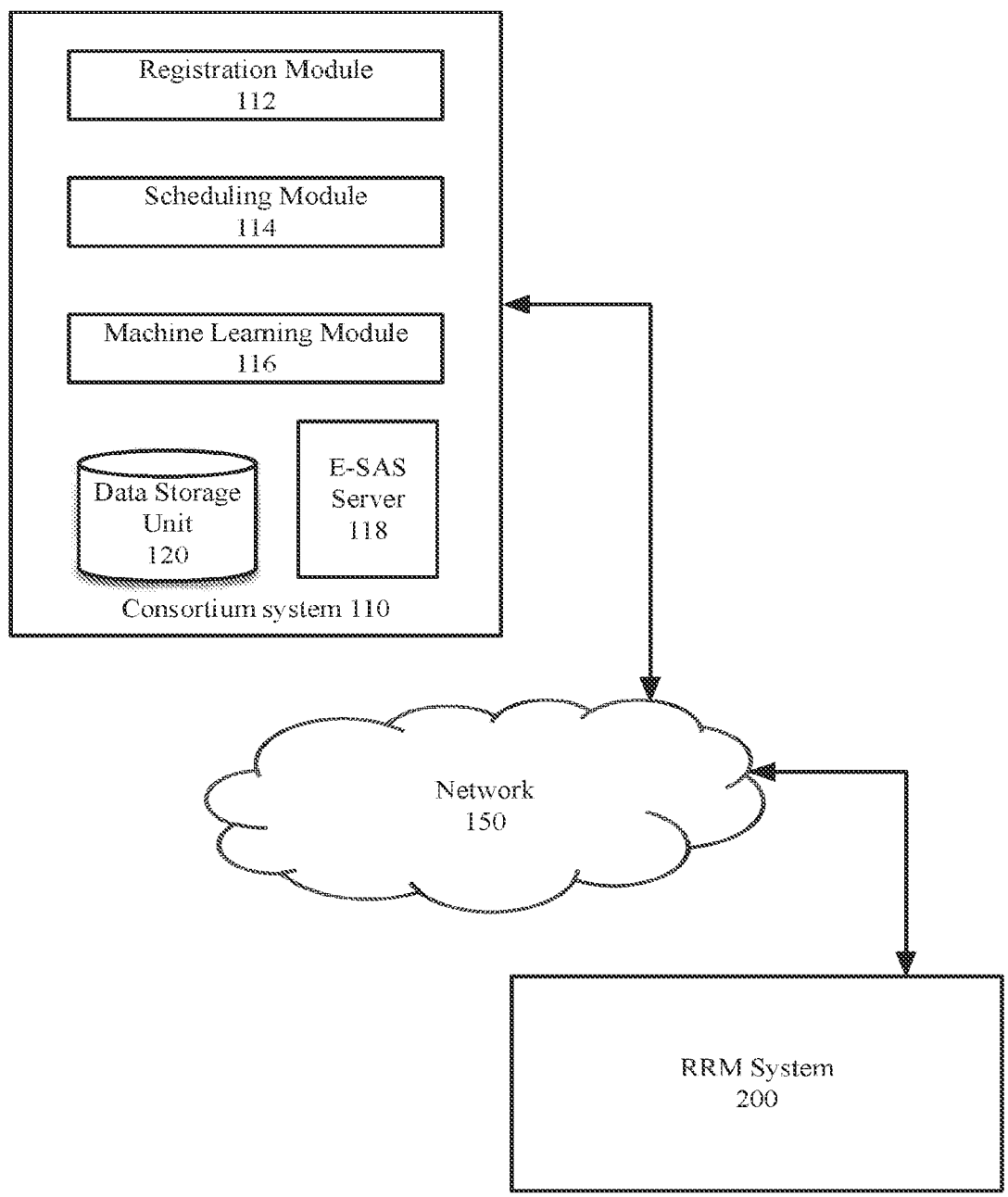
FIG. 1 is a block diagram depicting an enterprise spectrum allocation system, in accordance with certain examples.

The present technology allows coordination of channels of private wireless networks utilizing registered spectrum resources, including unlicensed, shared, locally-licensed, and licensed spectrum resources.

Wireless network operators in an enterprise location register to participate in a consortium by registering available spectrum resources, including unlicensed, shared, locally-licensed, licensed, or any other type of available spectrum resources. The wireless networks include Wi-Fi, $3^{rd}$ Generation Partnership Project ("3GPP"), industrial, proprietary, or any other suitable type of wireless network. The operators may be one or more computing devices functioning to manage a wireless network system, or in an alternate example, an operator may be a person responsible for managing a wireless network system. The consortium operates as a wireless network management authority for the enterprise location. The operators are associated with entities having spectrum resources within the enterprise location and register the spectrum resources to be shared with the members of the consortium. The operators may also associate with a spectrum access system, functioning to coordinate spectrum resources.

The Federal Communications Commission ("FCC") oversees commercial spectrum allocation. Spectrum can be licensed spectrum, which uses spatial divisions (different frequencies or geographies to prevent interference) and is bought for exclusive use by specific users. Licensed spectrum includes frequencies that can be reserved for a specific use, for example, frequencies licensed to cellular companies. Examples of licensed spectrum include citizens broadband radio service ("CBRS") and priority access licensed ("PAL") spectrum.

Spectrum can be shared spectrum. Spectrum sharing is the simultaneous usage of a specific radio frequency band in a specific geographic area by multiple entities. Shared spectrum can take multiple forms including, but not limited to, capacity sharing, spatial sharing, and priority sharing between various entities. There are different frameworks for spectrum sharing. Licensed CBRS spectrum can be shared based on a tiering system, where the top tier (e.g., radars, satellite companies, and wireless internet service providers) have the most protection. The second tier may include PAL spectrum, where users buy rights to use a portion of the available spectrum when it is not in use by the top tier. The third tier may include General Authorized Access ("GAA"), which provides the least protection. Spectrum sharing may include licensed shared access. In a licensed shared access framework, licensed spectrum holders may sub-license spectrum to other users in a controlled way. Spectrum sharing may also include concurrent shared access that allows one class of users to share spectrum with each other in a coordinated manner.

Spectrum can also be unlicensed spectrum, meaning anyone can use the frequency. As a user of unlicensed spectrum, there is no protection from interference from other users or a guarantee of spectrum availability. Unlicensed spectrum is publicly owned and free to use, for example, by Internet of Things ("IoT") devices. A wireless network may be based on one or more of licensed, shared, and unlicensed spectrum resources.

The operators request an allocation of spectrum resources from the consortium. Each operator requests a bandwidth of one or more types of spectrum registered with the consortium. The request may be in the form of mandatory or critical bandwidth requirements and non-critical or discretionary bandwidth requirements. The request may be input in the form of a schedule with hourly, daily, weekly, or monthly time entries.

The consortium generates a radio resource management ("RRM") plan for shared use of the licensed, shared, and unlicensed spectrum resources. The consortium determines coverage areas for registered spectrum resources for each of the operators. The consortium also determines areas in which the spectrum resources of the operators overlap with the spectrum resources of other operators in the consortium. For example, a particular operator may provide spectrum coverage over a 10,000 square meter area. A portion of the 10,000 square meter area may overlap with a spectrum coverage area of a second, or multiple other, operators. The consortium develops a target RRM plan using determined coverage areas for the registered spectrum resources, overlaps in registered channels, non-overlapping coverage areas, average area data rates, total area capacities, and the requested resources.

The consortium transmits a spectrum allocation request for one or more types of spectrum resources to each of the registered operators based on the target RRM plan. Based on responses from the operators, the consortium revises the target RRM plan. The consortium combines different types of spectrum resources to enable the target RRM plan resources for each operator. The consortium combines the allocated spectrum resources from each of the operators and distributes resources to each of the operators to meet the target RRM plan. The consortium then generates an RRM plan for implementation and transmits the plan to each of the registered operators. The RRM plan provides a schedule for bandwidth, transmission power, and duration for each operator.

The consortium monitors spectrum utilization of the operators to dynamically update the RRM plan. The consortium monitors spectrum utilization in real time to determine how closely the RRM plan matches the resources allocated to each operator. The consortium may monitor spectrum utilization in real time to determine if one or more operators are operating above an upper threshold or below a lower threshold of their current allotted resources. Resources from operators operating below a lower threshold of allotted resources may be redistributed to one or more of the operators exceeding an upper threshold of allotted resources.

The consortium may use a machine learning algorithm to learns trends from the monitored data to predict future spectrum utilization. The consortium determines if spectrum resources can be redistributed. As the consortium learns trends associated with spectrum utilization, spectrum resources may be redistributed based on an updated RRM plan to optimize the utilization of licensed, shared, and unlicensed spectrum resources.

This technology provides enhanced service outcomes of spectrum allocation. The technology provides benefits to the enterprise location and to the wireless network operators, including increased capacity reserves, increased reliability (including meeting requisite service level agreements), higher spectrum utilization, higher spectrum efficiency, and increased cost effectiveness for the wireless services and/or applications operating on the spectrum.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples of the technology are described in detail.

FIG. 1 is a block diagram depicting an enterprise spectrum allocation system ("E-SAS") 100, in accordance with certain examples. As depicted in FIG. 1, the E-SAS 100 comprises a consortium system 110 and a radio resource management ("RRM") system 200 configured to communicate with one another via one or more networks 150. In an alternate embodiment (not depicted), the E-SAS 100 is a component of the RRM system 200. RRM system 200 is described in greater detail herein with respect to FIG. 2.

In example embodiments, network 150 includes one or more wired or wireless telecommunications systems by which network devices may exchange data. For example, the network 150 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

The E-SAS 100 comprises a consortium system 110. The consortium system 110 may comprise one or more computing devices including a server, desktop computer, laptop computer, tablet computer, a television with one or more processors embedded therein and/or coupled thereto, smart phone, handheld computer, personal digital assistant ("PDA"), or any other wired or wireless, processor-driven device.

The consortium system 110 may comprise a registration module 112, a scheduling module 114, a machine learning module 116, an E-SAS server 118, and a data storage unit 120.

In an example embodiment, the registration module 112 is an interface through which one or more wireless network operators, spectrum allocation system ("SAS") operators, or any other suitable members may register to participate in a wireless network consortium. Registering to participate in the wireless network consortium comprises registering spectrum resources available to each operator including one or more of licensed, shared, and unlicensed spectrum resources.

In an example embodiment, the scheduling module 114 is an interface through which the registered operators may enter a schedule requesting an allocation of spectrum resources. The schedule may be entered on an hourly, daily, weekly, monthly, or any other suitable time window basis.

The registered operators may access the scheduling module 114 to revise and update the requested schedule as necessary.

In an example embodiment, the machine learning module 116 is configured to interface with the registration module 112, the scheduling module 114, the E-SAS server 118, and the data storage unit 120 to develop and update an RRM plan. In general, the machine learning module 116 can employ a variety of tools, applications, and devices. The machine learning module 116 may receive a continuous or periodic feed of data from one or more of the registration module 112, the scheduling module 114, the E-SAS server 118, the data storage unit 120, and the RRM system 200. Collecting the data allows the machine learning module 116 to leverage a rich dataset to use in optimizing the RRM plan. The machine learning module 116 may use one or more machine learning algorithms to develop and update the RRM plan such as Naïve Bayes Classifier, K Means Clustering, Support Vector Machine, Apriori, linear regression, logistic regression, decision trees, random forest, or any other suitable machine learning algorithm.

The E-SAS 100 comprises an E-SAS server 118. The E-SAS server 118 may function to provide storage and/or processing services for the E-SAS system 100. For example, the E-SAS server 118 may provide processing services for the registration module 112, the scheduling module 114, and/or the machine learning module 116.

The E-SAS 100 comprises a data storage unit 120. Data storage unit 120 comprises a local or remote data storage structure accessible to the E-SAS system 100 suitable for storing information. In an example embodiment, the data storage unit 120 stores encrypted information, such as HTML5 local storage.

Figure 2:
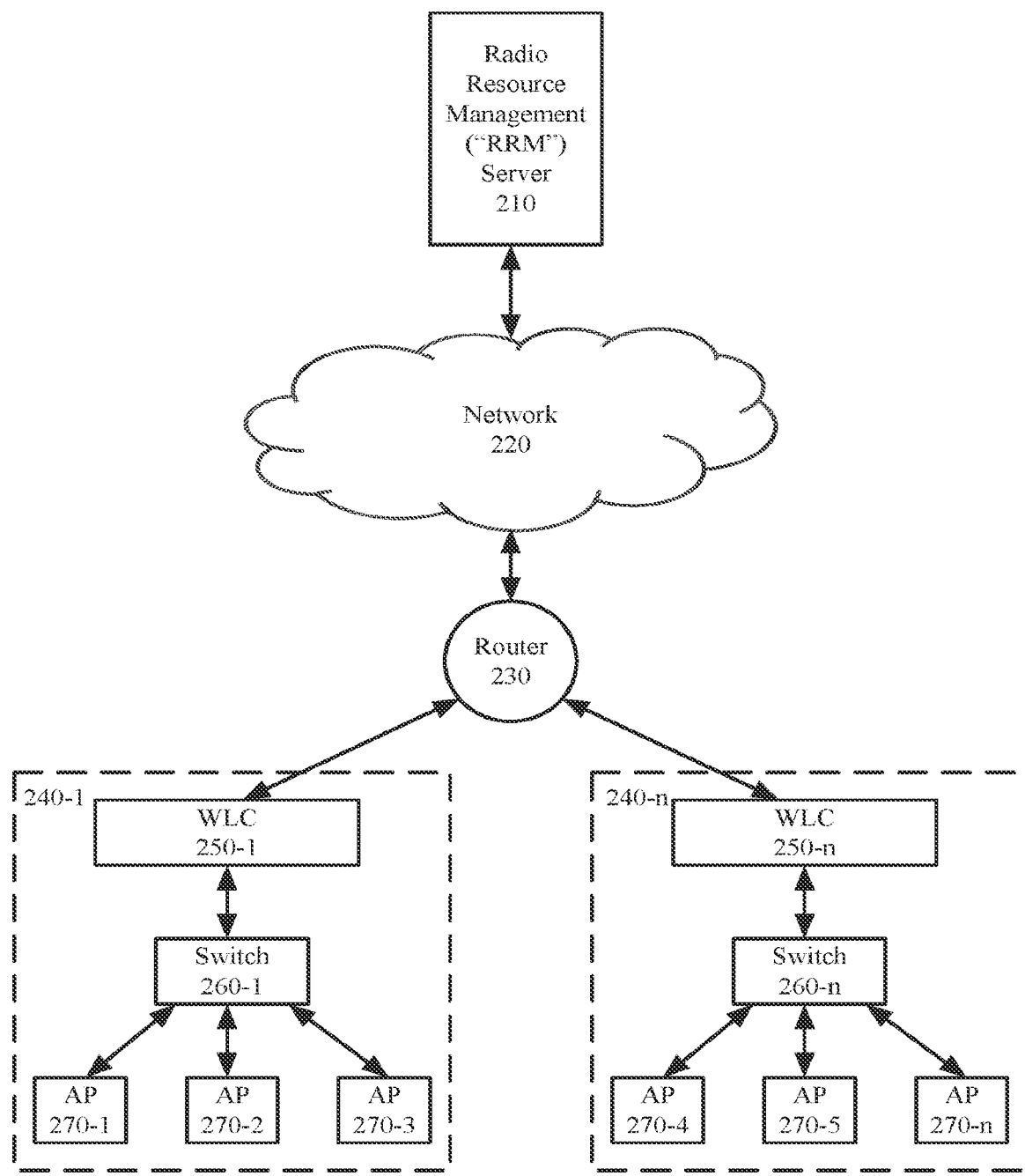
FIG. 2 is a block diagram depicting a radio resource management system, in accordance with certain examples.

FIG. 2 is a block diagram depicting a radio resource management ("RRM") system 200, in accordance with certain examples. As depicted in FIG. 2, the RRM system 200 comprises RRM server 210, network 220, router 230, and radio frequency ("RF") groups 240-1 through 240-n. Each RF group 240 comprises wireless local area network controllers ("WLCs") 250, switches 260, and access points ("APs") 270. While each server, network, and router shown in the architecture is represented by one instance of the server, network, and router, multiple instances of each can be used. In addition, while two RF groups are depicted in the architecture, multiple instances can be used.

The RRM system 200 comprises an RRM server 210. The RRM server 210 may comprise one or more computing devices and functions to manage the RRM system 200. The RRM server 210 is an authentication, authorization, and accounting ("AAA") platform to manage access to resources within the RRM system 200. The RRM server 210 functions to monitor, optimize, and troubleshoot the RRM system 200.

The RRM system 200 may comprise a network 220. The RRM server 210 may communicate with other components of the RRM system 200 via the network 220. In example embodiments, network 220 includes one or more wired or wireless telecommunications systems by which network devices may exchange data. For example, the network 220 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages.

Throughout the discussion of example embodiments, it should be understood that the terms "data" and "information" are used interchangeably herein to refer to text, images, audio, video, or any other form of information that can exist in a computer-based environment.

The RRM system 200 comprises a router 230. The router 230 functions to direct communications between the RF groups 240 and the RRM server 210 via network 220.

The RRM system 200 comprises one or more RF groups 240-1 through 240-n. The RF groups 240 are logical collections of WLCs 250, switches 260, and APs 270. Each RF group 240 has a user-configured RF network name with neighbor discovery performed at the radio level. APs 270 with the same RF network name can validate messages received from each other.

Each RF group 240 comprises one or more WLCs 250-1 through 250-n. WLCs 250 function to manage APs 270.

Each RF group 240 comprises one or more switches 260-1 through 260-n. The switches 260 function to allow communications between the WLCs 250 and the APs 270.

Each RF group 240 comprises APs 270-1 through 270-n. While APs 270-1 through 270-n are depicted as similar devices in FIG. 2, each AP 270 may be one or numerous different types of network hardware devices. Each AP 270 may include one or more radios to send and receive wireless radio signals. Each radio may have an internal antenna or both an internal and an external antenna. The 802.11 standard designates the radio frequencies use by each AP 270. Each AP 270 may connect to a router (not depicted in RF groups 240) or may be a component of the router itself.

Figure 9:
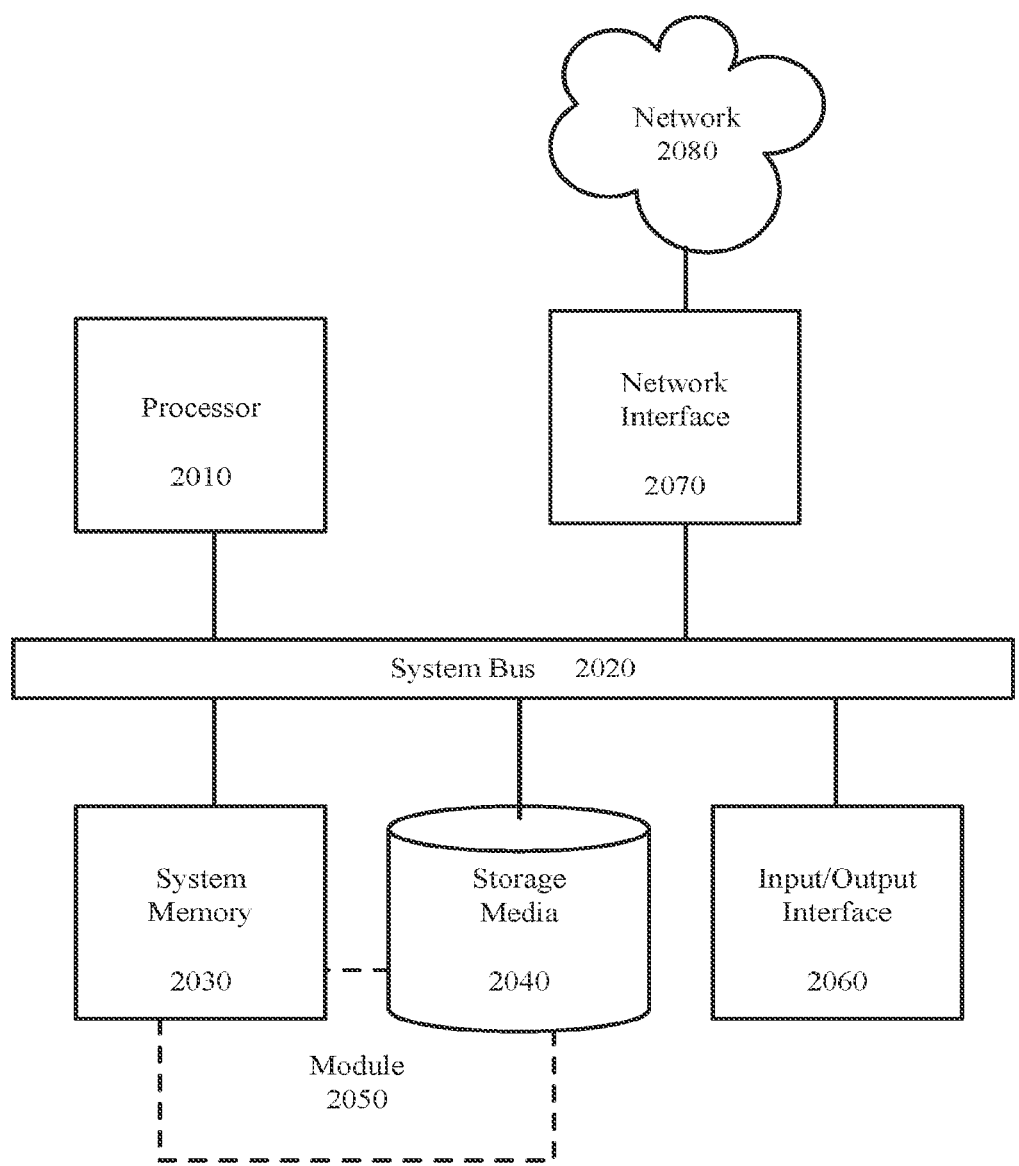
FIG. 9 is a block diagram depicting a computing machine and a module, in accordance with certain examples.

The network computing devices and any other computing machines associated with the technology presented herein may be any type of computing machine, such as, but not limited to, those discussed in more detail with respect to FIG. 9. For example, each device can include a server, a desktop computer, a laptop computer, a tablet computer, a television with one or more processors embedded therein and/or coupled thereto, a smart phone, a handheld computer, a PDA, a router, a switch, a hub, a gateway, a modem, an access point, a bridge, or any other wired or wireless processor-driven device. The computing machines discussed herein may communicate with one another, as well as with other computing machines or communication systems over one or more networks. Each network may include various types of data or communications networks, including any of the network technology discussed with respect to FIG. 9.

Furthermore, any modules associated with any of these computing machines, such as modules described herein or any other modules (scripts, web content, software, firmware, or hardware) associated with the technology presented herein may be any of the modules discussed in more detail with respect to FIG. 9.

The network connections illustrated are examples and other means of establishing a communications link between the computers and devices can be used. Moreover, those having ordinary skill in the art having the benefit of the present disclosure will appreciate that the devices illustrated in FIGS. 1 and 2 may have any of several other suitable computer system configurations.

Example Processes

The methods illustrated in FIGS. 3 through 8 are described hereinafter with respect to the components of the enterprise spectrum allocation system ("E-SAS") 100. The methods of FIGS. 3 through 8 may also be performed with other systems and in other environments. The operations described with respect to FIGS. 3 through 8 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 3:
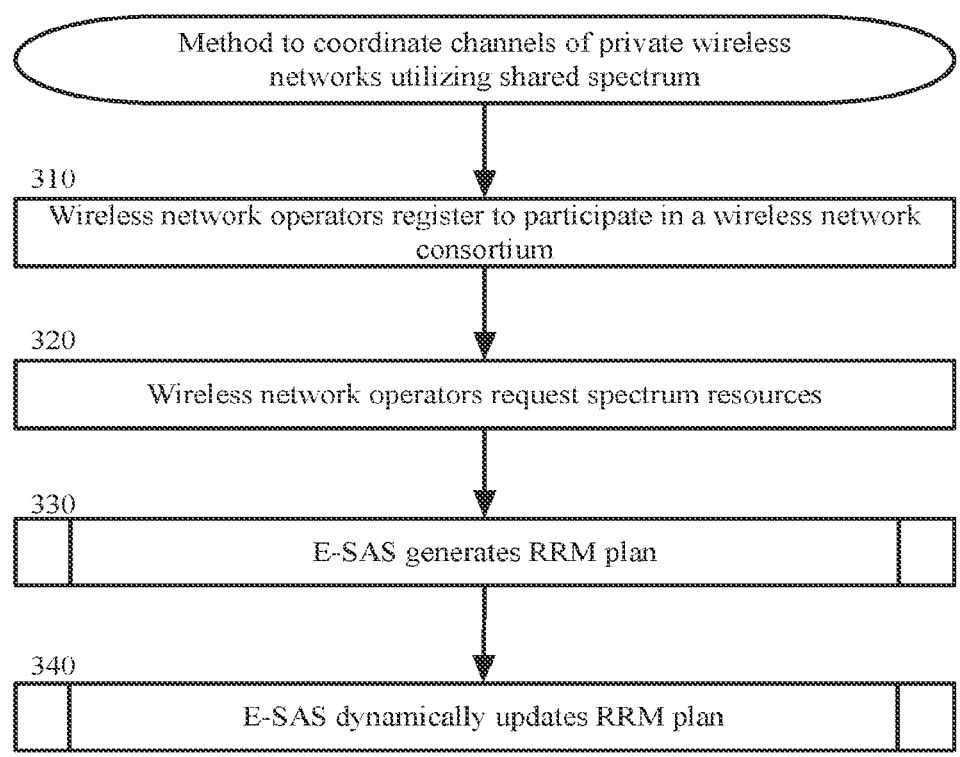
FIG. 3 is a block flow diagram depicting a method to coordinate channels of private wireless networks utilizing shared spectrum, in accordance with certain examples.

FIG. 3 is a block flow diagram depicting a method 300 to coordinate channels of private wireless networks utilizing shared spectrum, in accordance with certain examples.

In block 310, wireless network operators register to participate in a wireless network consortium. The wireless network consortium operates as a wireless network management authority for an enterprise location. The wireless network operators are associated with entities having spectrum resources within the enterprise location. The wireless network operators may be one or more computing devices functioning to manage a wireless network system, or in an alternate example, a wireless network operator may be a person responsible for managing a wireless network system. A wireless network operator may also be associated with a spectrum access system ("SAS") or equivalent spectrum coordinator for reserved leased spectrum access, for example citizens broadband radio systems ("CBRS") 3.5 GHz. Example enterprise locations may include a campus location such as a college or hospital, a metropolitan area, a tourist resort, a sports arena, a shopping mall, or any other suitable enterprise location with entities within a proximate location. Using the example of a shopping mall, the entities having spectrum resources may include stores, restaurants, entertainment venues, and any other entity that may reside within or in close proximity to the shopping mall's geographic location.

Registering to participate in the wireless network consortium comprises each wireless network operator providing radio resource management ("RRM") parameters to the E-SAS 100. The RRM parameters include information about the spectrum resources available to each wireless network operator, including licensed, shared, and unlicensed spectrum resources. Licensed spectrum is assigned exclusively to a particular wireless network operator for independent usage while unlicensed spectrum is associated with non-exclusive usage. Examples of spectrum may include CBRS, LTE, 5G, 5G NR-U, and Wi-Fi. The RRM parameters also include information such as geo-location, channel, transmit power ("TXP"), Wi-Fi neighbors, other known SAS neighbors (if available), as well as any other suitable RRM parameters. The registration information may be entered into a webpage associated with the wireless network consortium, an application associated with the wireless network consortium, or any other suitable method such that the E-SAS system 100 receives the registration information.

Figure 7:
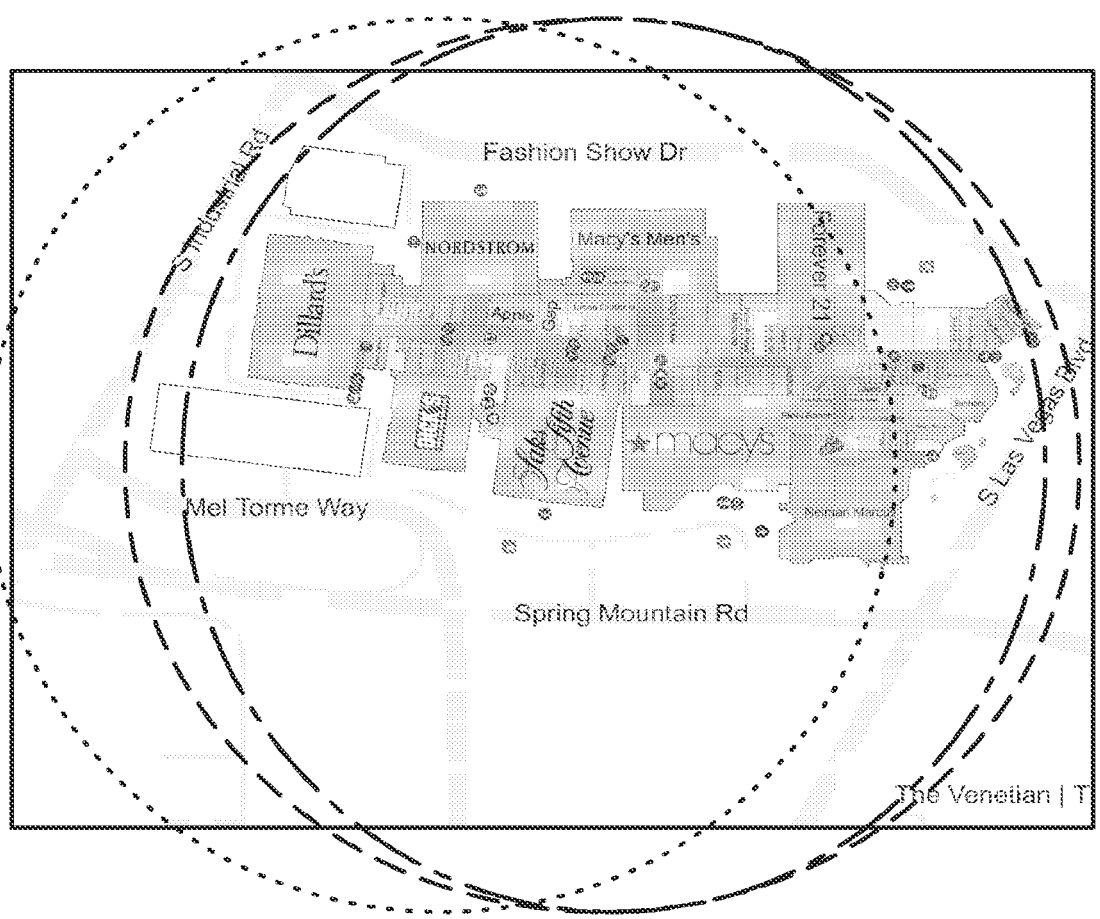
FIG. 7 is a diagram depicting an example enterprise location with multiple spectrum allocation systems, in accordance with certain examples.

Continuing with the example of the shopping mall, FIG. 7 depicts an enterprise location with multiple stores with registered spectrum resources including channels A, C, and D for a wireless network operator associated with a SAS 1; channels B, E, and F for a wireless network operator associated with a SAS 2; and channels G, and H for a wireless network operator associated with a SAS 3.

Returning to block 320 of FIG. 3, the registered wireless network operators request spectrum resources. Each wireless network operator requests a bandwidth of one or more of licensed, shared, or unlicensed spectrum. The request may be in the form of mandatory or critical bandwidth requirements and non-critical or discretionary bandwidth requirements. An example of a critical requirement may be 100 kb/s per square meter for sensor reporting on a factory floor sized at 10,000 square meters. An example of a non-critical requirement may be 1 Mb/s per square meter for streaming a video from the same factory floor. The request may be input in the form of a schedule with hourly, daily, weekly, monthly, or any other suitable time period entries. The bandwidth requests for licensed, shared, and unlicensed spectrum may be based on the bandwidth usage during typical operating conditions for a particular entity. Using an example as illustrated in FIG. 7, Dillard's may request a lower quantity of licensed bandwidth during weekday store operations than during weekend store operations. The lower quantity of licensed bandwidth during weekday store operations may be associated with a lower volume of sales during those store hours. Dillard's may also request a higher quantity of licensed bandwidth during overnight hours on the last Friday of each month due to scheduled inventory.

In block 330, the E-SAS 100 generates an RRM plan. Block 330 is described in greater detail herein with reference to the method 330 of FIG. 4.

Figure 4:
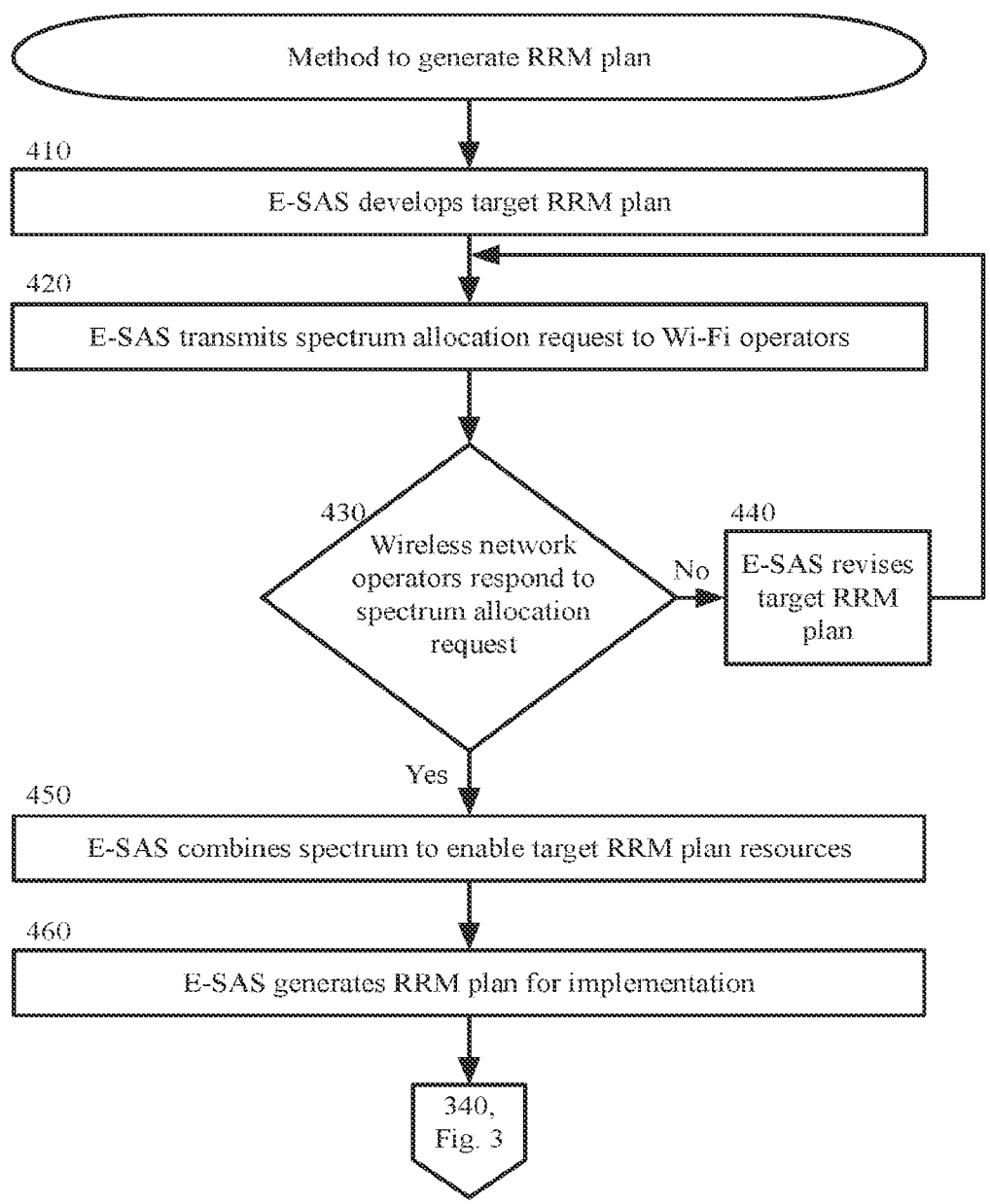
FIG. 4 is a block flow diagram depicting a method to generate a radio resource management plan, in accordance with certain examples.

FIG. 4 is a block flow diagram depicting a method 330 to generate an RRM plan, in accordance with certain examples.

In block 410, the E-SAS 100 develops a target RRM plan. The E-SAS 100 learns the coverage area for the spectrum resources registered by each wireless network operator. The E-SAS 100 may use an RRM learned neighborhood discovery via Neighbor Discovery Protocol ("NDP") for multi-access access points ("AP") 270 (e.g. Wi-Fi+5G or Wi-Fi+CBRS) to determine the coverage area of the currently active Wi-Fi radios in order to predict the coverage area of currently inactive 4G/5G radios.

In addition, the E-SAS 100 learns the overlaps in channels registered by each of the wireless network operators. Referring to the continuing example of a shopping mall, FIG. 7 depicts the spectrum overlap between the registered channels for SAS 1, SAS 2, and SAS 3. The E-SAS 100 develops a target RRM plan using the learned coverage area for the registered spectrum resources, the overlaps in registered channels, non-overlapping coverage areas, average area data rates, total area capacities, and the requested resources received from each wireless network operator in block 320 of FIG. 3.

In block 420, the E-SAS 100 transmits a spectrum allocation request to each of the registered wireless network operators. The spectrum allocation request is based on the target RRM plan and comprises a request for each wireless network operator to use specific unlicensed bandwidth and an attempt to re-allocate licensed spectrum, shared spectrum, or spectrum reserved by an SAS associated with a particular wireless network operator.

In block 430, each of the wireless network operators responds to the spectrum allocation request. If a response indicates that one or more of the wireless network operators does not approve the spectrum allocation request, the method proceeds to block 440. If each of the wireless network operators approves the spectrum allocation request, the method proceeds to block 450.

In block 440, the E-SAS 100 revises the target RRM plan based on the response received from each of the one or more wireless network operators. In an example, a particular wireless network operator received a request for 20 MHz of licensed spectrum during a designated time period. The particular wireless network operator responded with an allocation of 15 MHz during the designated time period. The E-SAS 100 revises the target RRM plan to accommodate the resources requested in block 320 with the allocated spectrum received in the responses to the spectrum allocation request. The method returns to block 420 and continues to loop until each of the wireless network operators approves the spectrum allocation request.

In block 450, the E-SAS 100 combines spectrum to enable the target RRM plan resources. The E-SAS combines the allocated licensed and shared spectrum from each of the wireless network operators to meet the target RRM plan. For example, two adjacent 10 MHz allocations may be combined to form one 20 MHz size allocation as requested by a particular wireless network operator.

Figure 8:
FIG. 8 is a diagram depicting an example enterprise location implementing an enterprise spectrum allocation system, in accordance with certain examples.
Figure 8:
Figure 8:
Figure 8:
Figure 8:
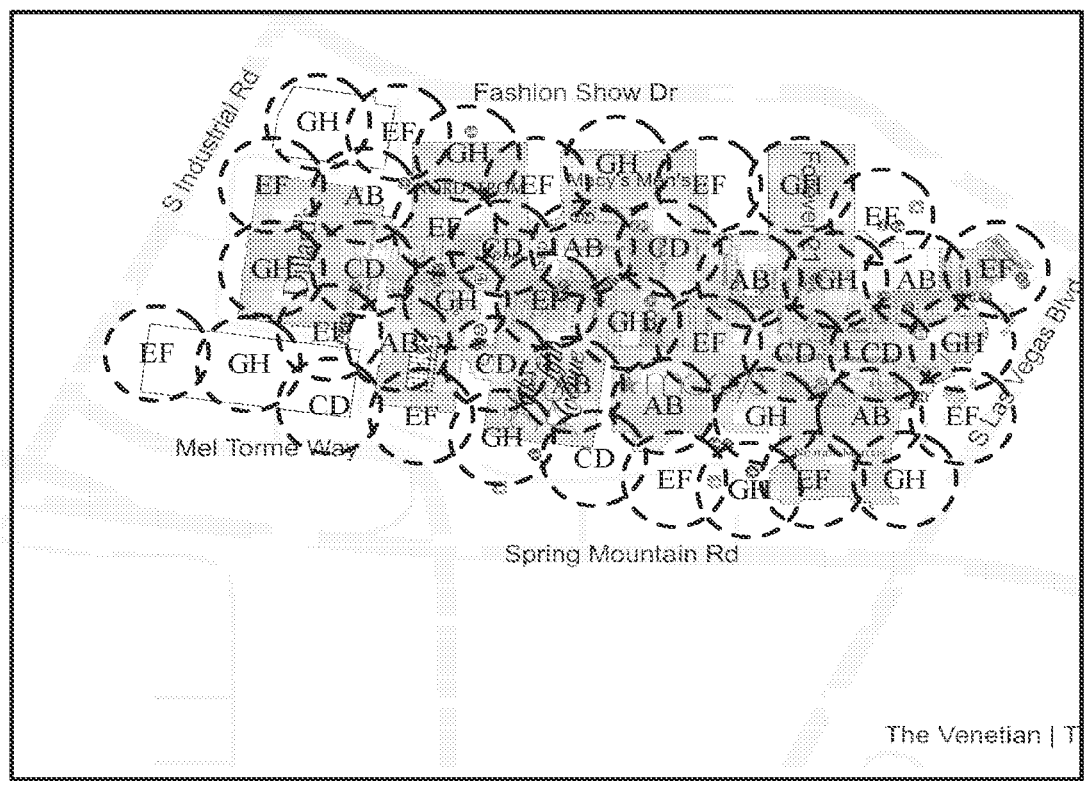

In block 460, the E-SAS 100 generates an RRM plan for implementation. The RRM plan is transmitted to each of the registered wireless network operators. The generated RRM plan may comprise operator instructions for implementation. For example, the instructions to a particular wireless network operator may instruct the operator to utilize a bandwidth "x" and a TXP "y" for a duration "z." The generated RRM plan may comprise a master schedule for each wireless network operator for bandwidth, TXP, and duration. In the continuing example of a shopping mall, FIG. 8 depicts a snapshot of combined spectrum in the RRM plan. From block 460, the method 330 returns to block 340 of FIG. 3.

In block 340, the E-SAS 100 dynamically updates the RRM plan. Block 340 is described in greater detail herein with reference to the method 340 of FIG. 5 and method 340' of FIG. 6. The method 340' is an alternate embodiment to dynamically update the RRM plan that incorporates the method 340 of FIG. 5.

Figure 5:
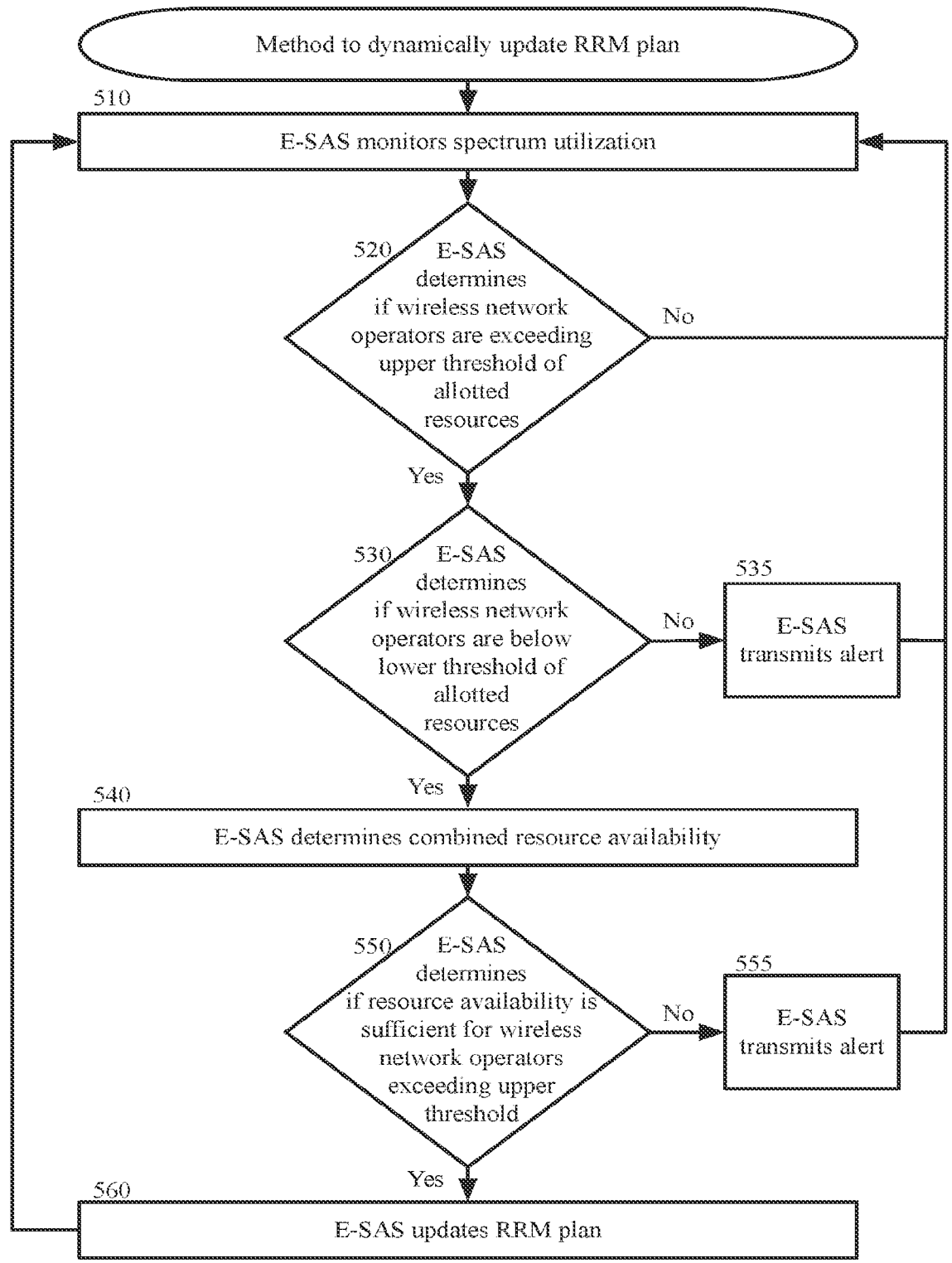
FIG. 5 is a block flow diagram depicting a method to dynamically update a radio resource management plan, in accordance with certain examples.

FIG. 5 is a block flow diagram depicting a method 340 to dynamically update an RRM plan, in accordance with certain examples.

In block 510, the E-SAS 100 monitors spectrum utilization. In an example, the E-SAS 100 monitors spectrum utilization in real time to determine how closely the RRM plan matches the scheduled bandwidth, TWP, and duration for each wireless network operator.

In block 520, the E-SAS 100 determines if one or more wireless network operators are exceeding an upper threshold of allotted resources. The E-SAS 100 may monitor spectrum utilization in real time to determine if one or more wireless network operators are within 70%, 80%, 90%, or any other suitable upper threshold of their current allotted resources. For example, if the upper threshold is 75%, and a wireless network operator is operating at 8 MHz of a 10 MHz allotment, the wireless network operator would be determined to be exceeding the 75% threshold. If no wireless network operators are determined to be exceeding an upper threshold of allotted resources, the method returns to block 510.

If one or more wireless network operators are determined to be exceeding an upper threshold of allotted resources, the method proceeds to block 530.

In block 530, the E-SAS 100 determines if one or more wireless network operators are below a lower threshold of allotted resources. The E-SAS 100 may monitor spectrum utilization in real time to determine if one or more wireless network operators are utilizing 20%, 30%, 40%, or any other suitable lower threshold of their current allotted resources. For example, if the lower threshold is 40%, and a wireless network operator is operating at 3 MHz of a 10 MHz allotment, the wireless network operator would be determined to be below the 40% threshold. If one or more wireless network operators are utilizing less than a lower threshold of allotted resources, those resources may be redistributed to one or more of the wireless network operators exceeding an upper threshold of allotted resources. If no wireless network operators are determined to be below a lower threshold of allotted resources, the method proceeds to block 535. If one or more wireless network operators are determined to be below a lower threshold of allotted resources, the method proceeds to block 540.

In block 535, the E-SAS 100 transmits an alert. The E-SAS 100 transmits an alert to the one or more wireless network operators exceeding an upper threshold of allotted resources. In an example, the alert indicates that there may be insufficient bandwidth available to a particular wireless network operator based on current spectrum utilization. The method returns to block 510 where the E-SAS 100 continues to monitor spectrum utilization.

In block 540, the E-SAS 100 determines combined resource availability. The E-SAS 100 determines a combined bandwidth of the one or more wireless network operators determined to be below a lower threshold of allotted resources.

In block 550, the E-SAS 100 determines if the combined resource availability is sufficient for one or more of the wireless network operators exceeding an upper threshold of allotted resources. In the previous example, the wireless network operator utilizing 8 MHz of a 10 MHz allotment was exceeding the 75% upper threshold by 0.5 MHz. The wireless network operator utilizing 3 MHz of a 10 MHz allotment was below the 40% lower threshold by 1 MHz. The E-SAS 100 would make a determination that sufficient resources are available for the wireless network operator exceeding the upper threshold of allotted resources. If the E-SAS 100 determines that insufficient resources are available, the method proceeds to block 555. If the E-SAS 100 determines that sufficient resources are available, the method proceeds to block 560.

In block 555, the E-SAS 100 transmits an alert, as previously described in reference to block 535.

In block 560, the E-SAS updates the RRM plan. The RRM plan is updated to re-allocate spectrum resources from the wireless network operators operating below a lower threshold to wireless network operators operating above an upper threshold. The RRM plan is transmitted to each of the registered wireless network operators as previously described herein in reference to block 460 of FIG. 4. From block 560, the method returns to block 510 where the E-SAS 100 continues to monitor spectrum utilization.

Figure 6:
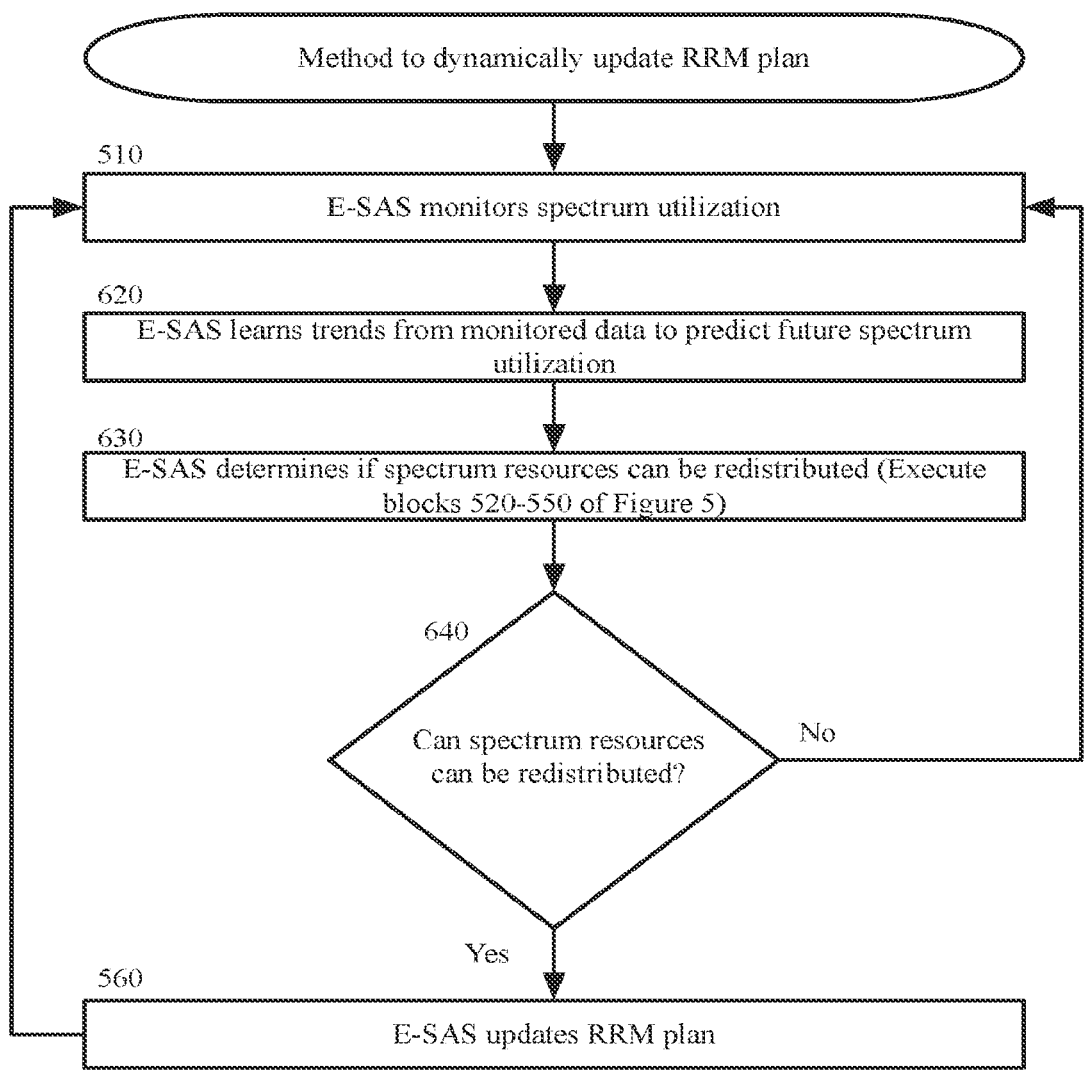
FIG. 6 is a block flow diagram depicting an alternate method to dynamically update a radio resource management plan, in accordance with certain examples.

FIG. 6 is a block flow diagram depicting a method 340' to dynamically update an RRM plan, in accordance with certain examples.

In block 510, the E-SAS 100 monitors spectrum utilization. Block 510 was previously discussed herein in reference to FIG. 5.

In block 620, the E-SAS 100 learns trends from the monitored data to predict future spectrum utilization. The E-SAS 100 may compare the monitored data to the scheduled resources in the RRM plan to learn trends associated with the monitored data. The E-SAS 100 may use the machine learning module 116 to learn the trends from the monitored data and predict future resource utilization. The machine learning module 116 may use one or more machine learning algorithms such as Naïve Bayes Classifier, K Means Clustering, Support Vector Machine, Apriori, linear regression, logistic regression, decision trees, random forest, or any other suitable machine learning algorithm.

Returning to the continuing example of the shopping mall, a particular store, such as Dillard's, may have requested a constant bandwidth of licensed spectrum during weekday operational hours. The E-SAS 100 may learn that the utilization of the allocated bandwidth to Dillard's actually trends up during the course of weekday operational hours as opposed to being constant. In an alternate example, the trend may be that bandwidth utilization increases during the course of a week with utilization being lower at the beginning of the week and increasing approaching the weekend.

In block 630, the E-SAS 100 determines if spectrum resources can be redistributed. As the E-SAS 100 learns trends associated with spectrum utilization, spectrum resources may be redistributed based on an updated RRM plan to optimize the utilization of licensed, shared, and unlicensed spectrum resources. In an example, wireless network operator A's spectrum utilization may be trending up on weekdays while a wireless network operator B's spectrum utilization may be trending down on weekdays (as compared to the scheduled spectrum allocation), allowing the spectrum resources to be redistributed from wireless network operator B to wireless network operator A.

To determine if spectrum resources can be redistributed, the method returns to block 520 of FIG. 5. The method proceeds from block 520 through block 550 as previously discussed herein with reference to FIG. 5. From block 550, the method returns to block 640 of FIG. 6.

In block 640, the E-SAS 100 has determined whether spectrum resources can be redistributed. In block 550 of FIG. 5, if the E-SAS 100 determines that resource availability is sufficient for wireless network operators exceeding an upper threshold (yes), block 640 proceeds to block 560 of FIG. 6. In block 560, the E-SAS updates the RRM plan. Block 560 was previously discussed herein with reference to FIG. 5. From block 560, the method returns to block 510 of FIG. 6 where the E-SAS 100 continues to monitor spectrum utilization.

In block 550 of FIG. 5, if the E-SAS 100 determines that resource availability is insufficient for wireless network operators exceeding an upper threshold (no), block 640 returns to block 510 of FIG. 6 where the E-SAS 100 continues to monitor spectrum utilization.

Other Examples

FIG. 9 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include WANs, LANs, intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method comprising:
receiving, at a radio-resource management (RRM) system, registration requests from a plurality of network operators, wherein each registration request indicates a first availability of a first type of spectrum resource and a second availability of a second type of spectrum resource provided by the respective network operators;
determining that a first network operator and a second network operator are both communicating in a geographic area;
allocating, by the RRM system, use of the first type of spectrum resource for use by a first network operator in the geographic area; and
allocating, by the RRM system, use of the second type of spectrum resource for use by a second network operator such that the first network operator and second network operator are communicating using different spectrum resources that are at least partially non-overlapping.

2. The method of claim 1, further comprising:
monitoring use of the first type of spectrum resource by the first network operator;
determining, based at least in part on the monitoring, to reduce a first quantity allocated to the first network operator to a second quantity; and
reducing the first quantity of the first type of spectrum resource allocated to the first network operator to a second quantity of the first type of spectrum resource.

3. The method of claim 1, wherein the first type of spectrum resource is licensed spectrum and the second type of spectrum resource is unlicensed spectrum.

4. The method of claim 1, further comprising:
monitoring use of the first type of spectrum resource by the first network operator;
determining, based at least in part on the monitoring, to increase a first quantity allocated to the first network operator to a second quantity; and
increasing the first quantity of the first type of spectrum resource allocated to the first network operator to a second quantity of the first type of spectrum resource.

5. The method of claim 4, further comprising:
monitoring use of the first type of spectrum resource by the first network operator;
determining, based at least partly on the monitoring, usage trends indicating future utilizations of the first type of spectrum resource by the first network operator; and
based on the usage trends, re-allocating the first quantity to a second quantity of the first type of spectrum resource.

6. The method of claim 1, wherein the registration requests include at least one of geolocations associated with the plurality of network operators, channels over which the plurality of network operators operate, or a transmit power at which the plurality of network operators communicate.

7. A radio-resource management (RRM) system comprising:
one or more processors; and
one or more non-transitory computer-readable media storing computer-executable instructions that, when executed by the one or more processors, cause the one or more processors to perform operations comprising:
receiving registration requests from a plurality of network operators, wherein each registration request indicates an availability of a type of spectrum resource provided by the respective network operators and coverage areas associated with the respective network operators;
determining, using the coverage areas, that a first network operator and a second network operator communicate using the type of spectrum resource in an overlapping coverage area;
determining to generate a schedule for the first and second network operators based at least in part on them communicating using the type of spectrum resource in the overlapping coverage area, wherein the schedule dictates quantity of spectrums resources that are allocated to the first and second network operators;
generating the schedule according to which at least the first network operator and the second network operator are allocated use of the type of spectrum resource;
allocating, using the schedule, a first quantity of the type of spectrum resource for use by the first network operator; and
allocating, using the schedule, a second quantity of the type of spectrum resource for use by the second network operator.

8. The RRM system of claim 7, wherein the schedule indicates that the first network operator is allocated use of the first quantity of the type of spectrum resource for a predefined period of time.

9. The RRM system of claim 7, the operations further comprising
monitoring use of the type of spectrum resource by the first network operator;
determining, based at least in part on the monitoring, to increase the first quantity allocated to the first network operator to a third quantity; and
increasing the first quantity of the type of spectrum resource allocated to the first network operator to the third quantity of the type of spectrum resource.

10. The RRM system of claim 7, the operations further comprising:
monitoring use of the type of spectrum resource by the first network operator;
determining, based at least in part on the monitoring, to reduce the first quantity allocated to the first network operator to a third quantity; and
reducing the first quantity of the type of spectrum resource allocated to the first network operator to the third quantity of the type of spectrum resource.

11. The RRM system of claim 7, wherein:
monitoring usage of the type of spectrum resource by the first network operator;
determining, based at least partly on the monitoring, usage trends indicating future utilizations of the type of spectrum resource by the first network operator; and
based on the usage trends, re-allocating the first quantity to a third quantity of the type of spectrum resource.

12. The RRM system of claim 7, wherein the first type of spectrum resource is licensed spectrum and the second type of spectrum resource is unlicensed spectrum.

13. A method comprising
receiving, at a radio-resource management (RRM) system, registration requests from a plurality of network systems, wherein each registration request indicates a first availability of a first type of spectrum resource and a second availability of a second type of spectrum resource provided by the respective network systems, the registration requests further including coverage areas associated with the plurality of network systems;

determining, using the coverage areas, that the first network system and a second network system communicate using the first type of spectrum resource in an overlapping coverage area;

determining to generate a schedule for the first and second network systems based at least in part on them communicating using the first type of spectrum resource in the overlapping coverage area, wherein the schedule dictates quantity of spectrums resources that are allocated to the plurality of network systems;

allocating a first quantity of the first type of spectrum resource for use by a first network system; and allocating a second quantity of the second type of spectrum resource for use by the first network system.

14. The method of claim 13, further comprising:
monitoring use of the first type of spectrum resource by the first network system;
determining, based at least in part on the monitoring, to reduce the first quantity allocated to the first network system to a third quantity; and
reducing the first quantity of the first type of spectrum resource allocated to the first network system to the third quantity of the first type of spectrum resource.

15. The method of claim 14, further comprising:
monitoring use of the first type of spectrum resource by the first network system;
determining, based at least partly on the monitoring, usage trends indicating future utilizations of the first type of spectrum resource by the first network system; and
based on the usage trends, re-allocating the first quantity to a third quantity of the first type of spectrum resource.

16. The method of claim 13, wherein the registration requests include at least one of geolocations associated with the plurality of network systems, channels over which the plurality of network systems operate, or a transmit power at which the plurality of network systems communicate.

17. The method of claim 13, further comprising:
determining that a first network system and a second network system are both communicating in an overlapping coverage area; and
allocating a third quantity of the second type of spectrum resource for use by a second network system.

18. The method of claim 13, further comprising:
monitoring utilization of the first quantity of the first type of spectrum resource and the second quantity of the second type of spectrum resource for the first network system; and
based at least in part on the monitoring, re-allocating, to the first network system, a third quantity of the first type of spectrum resource and a fourth quantity of the second type of spectrum resource.

* * * * *